United States Patent Office 3,473,836
Patented Oct. 21, 1969

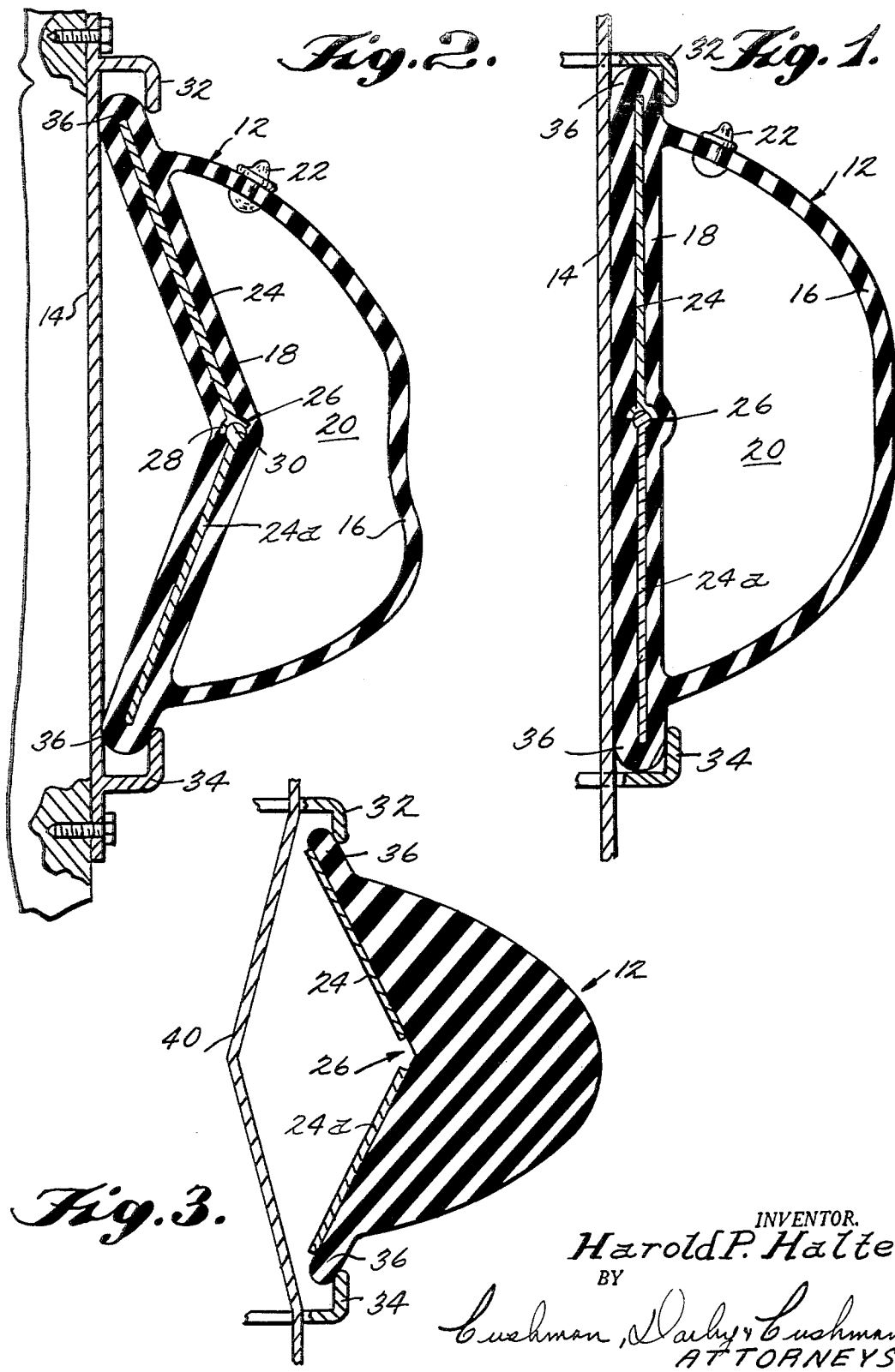

3,473,836
REINFORCED FLEXIBLE BUMPER ASSEMBLY
Harold P. Halter, 10701 Pressburg St.,
New Orleans, La. 70127
Filed Dec. 7, 1967, Ser. No. 688,755
Int. Cl. B60r 19/08
U.S. Cl. 293—60                                  9 Claims

ABSTRACT OF THE DISCLOSURE

A bumper assembly combination having a rigid mounting bracket which may be affixed to a vehicle, dock, or the like, and a flexible bumper with rigid hinged backing means to attachably mate with and lock into said rigid mounting bracket. The preferred form of the invention utilizes an attachable flexible pneumatic bumper having rigid backing members which can be flexed into locking positions in a metallic mounting bracket.

BACKGROUND OF THE INVENTION

Field of invention

The invention relates to a unique bumper attachment system for water or land vehicles, or for objects which may contact one another, to prevent damage by receiving or fending off blows from other vehicles or objects.

Description of prior art

The desirability of providing a bumper system to prevent damage to vehicles of all types including boats, automobiles, and the like, while maintaining a pleasing design and utility of operation, is well recognized.

Two examples of pertinent prior art are disclosed in Patents 2,959,146 to Erkert and 3,169,756 to Miller. Erkert discloses a two piece plastic bumper assembly for boats. While this structure utilizes a channeled support assembly which is somewhat similar to the assembly disclosed herein, the bumper itself is totally dissimilar. Erkert relies upon use of a concavo-convex resilient plastic insert as a bumper. The present invention discloses a totally different bumper construction having embedded locking rigid members in combination with an inflatable or resilient cushion. Also, it does not appear that the interior of the Erkert bumper is airtight, the bumper may collapse with great pressure, whereas in the present invention, the resistance to a blow is in direct proportion to the gravity of the blow.

Inflation of a cushion is not a new conception when considered in isolation. The Miller Patent 3,169,756 discloses an inflatable plastic body which can be nailed or adhered to an object which is to be protected. Miller however does not anticipate the present invention because emphasis is upon the wedding of two plastic materials in a permanent bumper. The present invention discloses a bumper which is easily and quickly attached to a mounting bracket by the use of rigid inserts which can be flexed into locked positions by an inflation of the bumper.

Further distinctions over the prior art will become obvious as reference is made to the drawings.

BRIEF SUMMARY OF THE INVENTION

The invention relates to a flexible bumper attachment and a rigid retaining mounting bracket wherein the flexible bumper has a rigid integral hinged backing means which may be hooked under overhanging lips which extend from the rigid mounting bracket retainer, said bumper being held in place by pneumatic or resilient pressure upon said hinged backing means.

It is an object of this invention to provide a bumper assembly which will be both attractive and durable, and the bumper assembly of this invention may be used on very large objects, such as barges or other vessels and vehicles.

Another object of this invention is to provide a bumper assembly which may be readily attached to or removed from an object.

A further object is to provide a bumper which will not collapse or come loose when forcefully struck even when used on relatively large objects which may receive heavy blows in normal usage.

Still further objects and the entire scope of the invention will become apparent in the more detailed discussion which follows.

BRIEF DESCRIPTION OF THE DRAWINGS

FIGURE 1 is a cross sectional illustration of a bumper insert of this invention as positioned in a retaining mounting bracket.

FIGURE 2 is a cross sectional view of the FIGURE 1 bumper insert partially removed from the mounting bracket.

FIGURE 3 is a variation of the FIGURE 1 bumper insert.

DETAILED DESCRIPTION OF INVENTION

FIGURES 1 and 2 illustrate a preferred embodiment of the invention wherein a flexible bumper attachment 12 is of a type which can be inflated to lock the bumper attachment into a retained position within a rigid mounting bracket 14. The illustrated bumper attachment can be inflated with a compressed gas so as to present the configuration shown in FIGURE 1, and a deflation or partial deflation of the bumper attachment results in the configuration illustrated in FIGURE 2. Of course, the use of pneumatic pressure in the bumper attachment not only provides for a locking and unlocking of the attachment to a mounting bracket, but also, the pneumatic construction provides a compressible bumper or cushion which can receive relatively heavy blows and forces.

The bumper attachment 12 includes a flexible bumper wall 16 which is designed and shaped to extend outwardly from whatever surface the bumper is mounted against. The bumper attachment also includes a backing wall 18 which functions as a retaining wall which can be inserted into and locked against a mounting bracket 14. The outer bumper wall 16 and the inner retaining wall 18 are integrally formed with one another to define a sealed cavity 20 within the bumper attachment. The bumper attachment is formed in any desired length having the cross section constructions shown in the figures, and terminal end portions of the bumper attachment are sealed off so that the cavity 20 may be completely sealed from the surrounding environment. A conventional pneumatic valve 22 is provided in each bumper assembly for controlling the introduction or release of a gas into and out of the cavity 20. Although any gas, such as compressed air, may be used, it is also contemplated that inert gases, such as nitrogen, may be used so as to not deteriorate the material from which the bumper attachment is manufactured. The bumper attachment may be made from any suitable flexible material such as rubber or known synthetic plastic materials.

A further feature of the bumper attachment resides in the provision of rigid backing plates 24 and 24a which are included as a part of the retaining wall 18 of the bumper. The rigid backing plates may be formed from any known material, and various metals have been utilized for the construction of the backing plate members. The backing plates 24 and 24a may be embedded into and formed integrally with the retaining wall 18, as shown in FIGURES 1 and 2. Alternatively, the rigid backing plates may be affixed to an outside surface of the backing and retaining wall 18, as illustrated in FIGURE 3. In either case, it is preferred that two backing plate members be provided in a single bumper attachment so that a flexing and locking action can be obtained when the retaining wall 18 of a bumper attachment is mounted into a mounting bracket 14. The separate backing plates 24 and 24a may consist of separate strips of rigid material which extend for the full length of the bumper attachment, but alternatively, the separate backing plates for a single bumper attachment may consist of spaced segments extending along the length of the bumper so as to provide a rigid back which can be flexed and locked in the same manner as that shown in FIGURES 1–3. The flexing and locking action obtained from the backing plates 24 and 24a results from the special relationship of the plates to one another. As illustrated in FIGURES 1 and 2, the separate plates 24 and 24a may be hinged to one another at 26 so that a hinge axis is provided for the full length of the bumper attachment and along an approximate mid point of the backing wall 18. The hinge construction which is illustrated in FIGURES 1 and 2 includes a recess or channel 28 formed along one edge of the backing plate 24 for receiving a rounded edge portion 30 of the backing plate 24a. Another type of hinge access is formed by the arrangement shown in FIGURE 3 wherein the separate backing plates 24 and 24a are merely spaced from another along the mid point of the back surface of the bumper 12 so that the two plates can be flexed relative to one another. The provision of hinged backing plates on a mounting or retaining wall section of a bumper permits a flexing of the bumper attachment, as shown in FIGURES 2 and 3, for inserting the bumper into a retained position relative to a mounting bracket 14. At the same time, there is provided a very firm and rigid locking of the bumper attachment into its mounted position once the separate backing plate members have been moved to the substantially aligned positions shown in FIGURE 1. The mounting bracket 14 may comprise a metal bracket which can be separately attached to whatever surface is being protected, or a mounting means may be provided as shown in FIGURE 1 by affixing or securing separate flanges or lips 32 and 34 directly against the surface to be protected. Basically, the mounting bracket consists of spaced and parallel lips 32 and 34 which are positioned to receive and retain extensions of edges 36 of the bumper attachment 12. By utilizing the novel bumper attachment of this invention, it is not necessary to use any separate securing devices or fasteners for mounting a bumper into the type of mounting bracket which has been shown. When it is desired to assemble a bumper with a mounting bracket, it is only necessary to flex the back wall of the bumper, as shown in FIGURE 2 so as to place the extended edges 36 into channels formed by the lips 32 and 34 of the mounting bracket. Once the extended edges 36 are aligned in a mounting position, the backing and retaining wall 18 of the bumper can be locked by introducing compressed gas through the valve 22 and into the cavity 20. The pneumatic pressure which develops in the cavity 20 forces the backing and retaining wall 18 into the locked position shown in FIGURE 1. In this position the backing plates 24 and 24a are substantially aligned with one another and this provides a very strong and rigid mounting of the entire bumper attachment to the object which is being protected. If it is desired to remove or replace a bumper attachment, compressed gas can be released from the cavity 20 so as to deflate the bumper sufficiently to remove the same from the mounting bracket.

FIGURE 3 illustrates an alternative construction for a bumper attachment having the features of this invention. In the FIGURE 3 embodiment the main body of the bumper is formed from a compressible material such as a foamed resin or similar sponge-like material, and it is not necessary to inflate the bumper with a compressed gas. Although the backing plate members 24 and 24a may be molded in situ in the construction shown for FIGURE 3, they also may be merely adhered to an outside backing wall of the bumper body as illustrated. The backing wall of the FIGURE 3 bumper is normally flat with the two backing plates 24 and 24a affixed thereto in substantially aligned positions. However, when it is desired to mount the bumper attachment into a mounting bracket 14, the plates 24 and 24a are flexed inwardly into the compressible material of the bumper body, and when the bumper is in position for mounting, the plates 24 and 24a are released to snap outwardly to their normal positions which lock the bumper attachment into the mounting bracket.

The bumper attachment of this invention cannot be removed by simple abrasive action. When the bumper 12 is struck on the outer flexible wall 16, the effect is to cause the wall 16 to flex inwardly. The inward flexing of the wall lessens the volume of the bumper cushion and compresses the air therein. The compressed air therefore exerts an even greater pressure upon the rear wall 18. When this greater pressure is exerted upon the rear wall 18, the rigidity of the linked plates 24 and 24a is assured, and the bumper remains tightly locked into the bracket 14.

While various materials may be used, it has been found preferably to make the flexible bumper of rubber, and the hinged support plates 24 and 24a of steel or aluminum. The mounting racket may be made of steel or aluminum. When the mounting bracket is to be placed upon a wooden vessel or a stationary wooden dock or the like, it has been found preferable to use the integral all metal type of bracket disclosed in FIGURE 2. On the other hand, when the bumper is to be attached to a metal surface, it may be preferable to weld separate flanges to the surface, as shown in FIGURE 1.

The widths, lengths, and thicknesses of the fender bumpers and the mounting bracket depends upon the anticipated impact loads. The invention attachment system may be used with all types of loads where varying degrees of impact are expected. For instance the bumper system may be used about a child's wagon, or may be used about heavy ocean going vessels or barges.

While it is convenient to have a straight wall between the flanges it is not necessary. For instance in FIGURE 3 the wall 40 is shown to be V-shaped, and this type of construction places the backing members into "over deadcenter" positions when they are locked into a bracket. Also it will be well understood that while the illustrations show joints substantially mid-way between the two plates, that these joints could be off center and the plates could be of different or varying lengths.

Obviously many modifications and variations of the present invention are possible in light of the above teachings. All modifications and variations which may become obvious to those killed in this art are intended to be included within the following claims.

What is claimed is:

1. In a bumper assembly of the type which includes a mountng bracket having spaced flanges defining channels to receive marginal edges of a compressible bumper attachment, the improvement in the compressible bumper attachment comprising:

a backing and retaining wall construction for locking and unlocking the bumper attachment relative to said mounting bracket, said backing and retaining wall further including at least two rigid backing plate members having a hinge axis therebetween which extends along said backing and retaining wall, whereby the backing and retaining wall can be displaced inwardly towards the interior of said bumper attachment and along said hinge axis for inserting or removing said bumper attachment relative to said mounting bracket, and means for flexing said separate plate members into extended and aligned positions which lock said bumper attachment into the channels of said mounting bracket.

2. The improvement of claim 1 wherein said means for flexing said separate backing plate members into locked positions comprises an inflatable portion of said bumper attachment which applies a pressure to said backing and retaining wall when inflated.

3. The improvement of claim 2 wherein said inflatable portion of the bumper attachment also functions as a cushioning means for absorbing forces directed to said bumper assembly.

4. The improvement of claim 1 wherein said means for flexing said separate backing plate members into locked positions comprises an expansible material included in the body of said bumper attachment.

5. The improvement of claim 1 wherein said rigid backing plate members are embedded into said backing and retaining wall.

6. The improvement of claim 1 wherein said rigid backing plate members are adhered to a surface of said backing and retaining wall construction.

7. The improvement of claim 1 wherein said backing and retaining wall construction includes extended marginal edge portions which can be fitted into said channels of said mounting bracket.

8. The improvement of claim 1 wherein adjoining edges of said backing plate members are hingedly connected to form said hinge axis.

9. The improvement of claim 1 wherein said backing plate members are spaced from one another to form a hinge axis between their adjacent edges.

References Cited

UNITED STATES PATENTS

| | | | |
|---|---|---|---|
| 2,062,313 | 12/1936 | Jandus et al. | 293—67 |
| 2,144,167 | 1/1939 | Sanders | 293—67 |
| 2,731,290 | 1/1956 | Corydon | 293—67 |
| 2,959,146 | 11/1960 | Erkert | 114—219 |
| 3,169,756 | 2/1965 | Miller | 293—71 X |
| 3,197,189 | 7/1965 | Pemper et al. | 114—219 X |
| 3,290,082 | 12/1966 | Fritsch | 293—1 |

ARTHUR L. LA POINT, Primary Examiner

H. BELTRAN, Assistant Examiner

U.S. Cl. X.R.

267—1; 293—65, 67, 71; 114—219